US 012107847B2

(12) United States Patent
Barui et al.

(10) Patent No.: US 12,107,847 B2
(45) Date of Patent: Oct. 1, 2024

(54) PASSWORD RESET USING AN ASYMMETRIC ENCRYPTION KEY PAIR

(71) Applicant: SAP SE, Walldorf (DE)

(72) Inventors: Subhamay Barui, Pune (IN); Ramesh Gupta, Pune (IN); Jagriti Jalal, Haldwani (IN)

(73) Assignee: SAP SE, Walldorf (DE)

( * ) Notice: Subject to any disclaimer, the term of this patent is extended or adjusted under 35 U.S.C. 154(b) by 360 days.

(21) Appl. No.: 17/717,352

(22) Filed: Apr. 11, 2022

(65) Prior Publication Data

US 2023/0328055 A1 Oct. 12, 2023

(51) Int. Cl.
*H04L 9/40* (2022.01)
*H04L 9/08* (2006.01)

(52) U.S. Cl.
CPC .......... *H04L 63/083* (2013.01); *H04L 9/0825* (2013.01); *H04L 9/0861* (2013.01); *H04L 9/0891* (2013.01)

(58) Field of Classification Search
CPC ... H04L 63/083; H04L 9/0825; H04L 9/0861; H04L 9/0891; H04L 9/3247
See application file for complete search history.

(56) References Cited

U.S. PATENT DOCUMENTS

| | | | | |
|---|---|---|---|---|
| 6,128,742 A * | 10/2000 | Felt | ....................... | H04L 63/083 726/5 |
| 9,083,739 B1 * | 7/2015 | Call | .................... | H04L 63/0846 |
| 2006/0195402 A1 * | 8/2006 | Malina | ...................... | H04L 9/14 705/50 |
| 2008/0104411 A1 * | 5/2008 | Agrawal | ............. | H04L 63/0846 726/6 |
| 2014/0109206 A1 * | 4/2014 | Goel | ....................... | H04L 63/20 726/6 |
| 2014/0304794 A1 * | 10/2014 | Gargaro | .................. | G06F 21/41 726/8 |
| 2015/0052350 A1 * | 2/2015 | Aumasson | .............. | H04L 63/12 713/155 |
| 2016/0112396 A1 * | 4/2016 | Paya | ..................... | H04L 63/083 713/156 |
| 2016/0112413 A1 * | 4/2016 | Wang | .................... | G06F 16/137 713/171 |
| 2018/0375645 A1 * | 12/2018 | Hanumantharau | ... | H04L 63/083 |
| 2021/0226992 A1 * | 7/2021 | Sellers | .................... | G06F 21/45 |

\* cited by examiner

*Primary Examiner* — J. Brant Murphy
(74) *Attorney, Agent, or Firm* — Sterne, Kessler, Goldstein & Fox P.L.L.C.

(57) ABSTRACT

Disclosed herein are system, method, and computer program product embodiments for securely performing a password change. An embodiment operates by receiving a password change request from a user. The password change request comprises an encrypted version of a new password for the user, a cleartext version of the new password, and a login name for the user. The embodiment then executes a command from a password rotator user account with the cleartext version of the new password, the encrypted version of the new password, and the login name. The embodiment then retrieves a public key associated with the login name. The embodiment then determines, based on the public key, that the password change request comes from the user and that the cleartext version of the new password has not been modified. The embodiment then sets the password of a user login associated with the user to the new password.

20 Claims, 3 Drawing Sheets

PASSWORD RESET USING AN ASYMMETRIC ENCRYPTION KEY PAIR

BACKGROUND

Various types of user logins may exist at a server. Different roles and privileges may be assigned to these user logins so that the associated users can perform their work. When a user login is created, and certain privileges are assigned to it, there is a probability that some unauthorized user may use the login and perform some unwanted activity. To stop such unauthorized access, a user login may be authenticated by the server using various mechanisms. For example, the server may authenticate a user login using a password. The password may be created as part of creating the user login.

But a user may forget or lose her password. In this case, the user may not be able to access the server anymore because their user login cannot be authenticated. To get out of this situation, the server may create a separate user login with an appropriate role or privilege that can change or reset another user's password. This separate user login may be referred to as a password rotator. The password rotator may be used to implement an automated system that can accept a password change request (e.g., a password reset request or a password rotation request) from a user.

However, the password rotator may not be able to verify the authenticity of the user who submitted the password reset request. As a result, an unauthorized or illegitimate user may pretend to be a legitimate user and request the password rotator to change the legitimate user's password. The password rotator may also not be able to verify the integrity of the newly provided password. In other words, the password rotator may not be able to verify that the newly provided password has not been tampered with during the password change process. If these situations happen, the legitimate user may lose access to the server. In addition, an illegitimate user may gain access to the server on behalf of the legitimate user.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for securely performing a password change (e.g., a password reset or password rotation) with authenticity and integrity.

An embodiment operates by receiving a password change request from a user. The password reset request may include an encrypted version of a new password for the user, a cleartext version of the new password, and a login name for the user. The encrypted version of the new password may be encrypted with a private key associated with the user. The embodiment executes a command from a password rotator user account with the cleartext version of the new password, the encrypted version of the new password, and the login name for the user. The embodiment retrieves a public key associated with the login name for the user. The embodiment determines that the password change request legitimately comes from the user and that the password change request has not been modified. The embodiment then sets the password of the user to the new password in response to the determining.

The embodiment can solve at least two technological problems. First, the embodiment can verify the authenticity of the user who submitted the password change request. Second, the embodiment can verify the integrity of the newly provided password.

Figure 1:
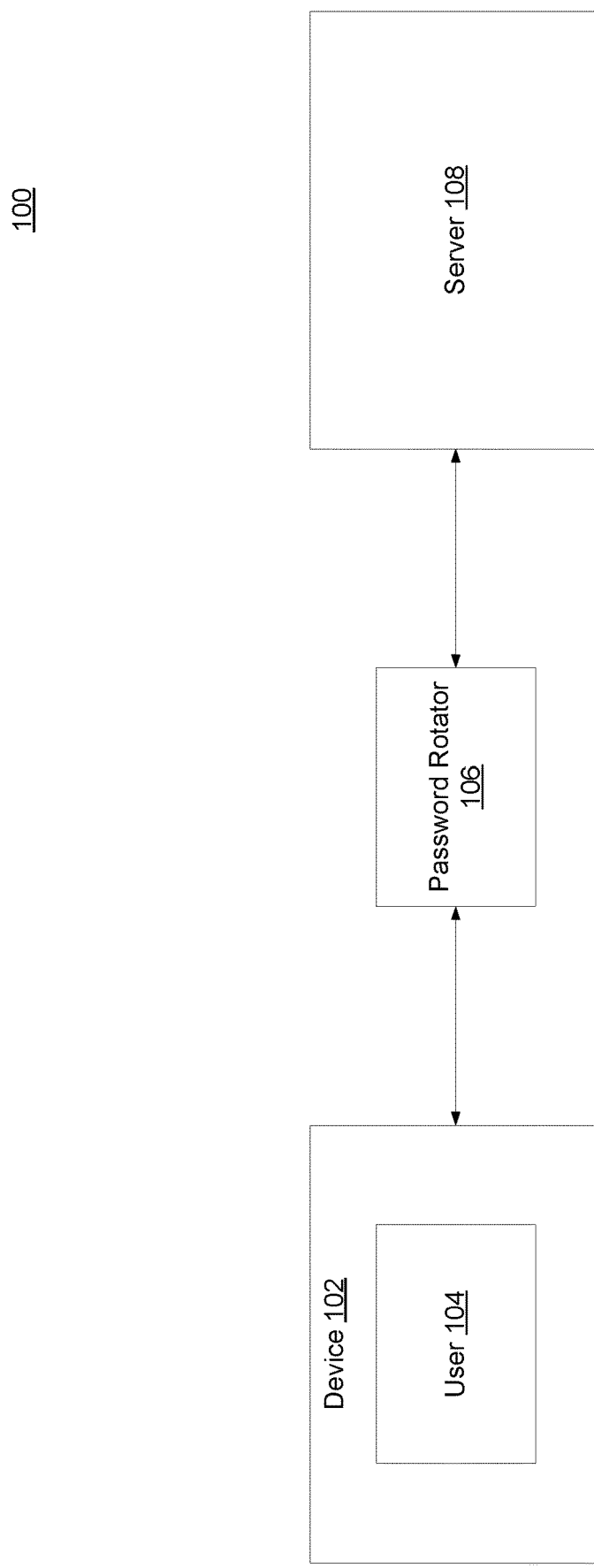
FIG. 1 is a block diagram of a system that securely performs a password change, according to some embodiments.

FIG. 1 is a block diagram of a system 100 that that securely performs a password change, according to some embodiments. System 100 can include device 102, user 104, password rotator 106, and server 108.

Device 102 can be a desktop computer, server, virtual machine, container, laptop, tablet, smartphone, or other device as would be appreciated by a person of ordinary skill in the art. Device 102 may be communicatively coupled to server 108. For example, device 102 may communicate with server 108 over a communications path, which may be wired and/or wireless (or a combination thereof), and which may include any combination of LANs, WANs, the Internet, etc. Control logic and/or data may be transmitted to and from server 108 via the communication path.

Server 108 can be a desktop computer, server, virtual machine, container, laptop, tablet, smartphone, or other device as would be appreciated by a person of ordinary skill in the art. For example, server 108 may be a database management system (DBMS) server.

A user 104 at device 102 may access server 108. The user 104 may have a user login for server 108. The user 104 may use their user login to perform various activities on server 108. The user 104 may perform various activities on server 108 based on the user role and or privileges assigned to their user login.

To ensure authorized access to server 108, server 108 may authenticate the user login using a password. However, if the user 104 forgets her password for her user login, the user 104 may not be able to access server 108 anymore. To get out of this situation, server 108 may use password rotator 106. Password rotator 106 may be a separate user login with an appropriate user role or privilege that can change or reset another user's password. Password rotator 106 may be used to implement an automated system that can accept a password change request from the user 104. The automated system associated with password rotator 106 can be implemented on server 108 or in a separate module communicatively coupled to server 108. Password rotator 106 can then change the password for the user login on behalf of the user 104.

To securely change the password for the user login at server 108 on behalf of the user 104, system 100 may use an asymmetric encryption key pair and custom commands for server 108 (e.g., extended Structured Query Language (SQL) commands). To begin, the user 104 may generate an asymmetric encryption key pair (also referred to as a public-key cryptography key pair). The pair may include a public key (which may be known to others) and a private key (which may not be known by anyone except the user 104).

The public key and private key may be implemented using Rivest-Shamir-Adleman (RSA) encryption, Elliptic Curve Digital Signature Algorithm (ECDSA) encryption, or various other public-key cryptography approaches as would be appreciated by a person of ordinary skill in the art. The user 104 can encrypt a message using their private key, but that encrypted message can only be decrypted with the user 104's public key. Thus, anyone with the user 104's public key can be assured that only the user 104 sent the message. System 100 can use this property to securely change the password for the user login at server 108 on behalf of the user 104. As would be appreciated by a person of ordinary skill in the art, the asymmetric encryption key pair may be shared by a set of users (including the user 104).

After generating the asymmetric encryption key pair, the user 104 can save the private key in a secure location outside of server 108. For example, the user 104 can securely save the private key on device 102. The user 104 can later use the private key as an identifier to securely identify themselves to server 108.

To enable secure user identification to server 108, the user 104 can provide the corresponding public key to server 108. For example, the user 104 can provide the corresponding public key to server 108 such that server 108 saves the public key with the user login for the user 104.

The user 104 may provide the corresponding public key to server 108 by executing a command at server 108 with the public key as a parameter. In the case of server 108 being a DBMS, the user 104 may execute an extended SQL command at server 108 with the public key as a parameter. Server 108 may define the extended SQL command. The execution of the extended SQL command may cause server 108 to save the provided public key with the user login for the user 104.

For example, the user 104 may execute an extended SQL command of "SET PASSWORD VERIFICATION USING<public key value|public key file>" to save the provided public key with the user login for the user 104. In this example, "public key value" may represent the public key (e.g., expressed in hexadecimal form). The public key may also be provided as "public key file," where "public key file" represents a filename path to the public key.

In response to executing the command at server 108 with the public key as a parameter, server 108 may save the public key with the user login for the user 104. As a result, password rotator 106 may be able to securely change the password for the user login of the user 104 at server 108. The secure change of the password for the user login of the user 104 at server 108 may be triggered as a result of various circumstances. For example, the user 104 may want to securely change the password for their user login at server 108 as a result of losing or forgetting their password. Password rotator 106 may also issue a request for the user 104 to change their password for their user login at server 108 because their password may have been compromised or may have not been changed for a threshold amount of time (e.g., more than a month).

In response to a trigger to change their password, the user 104 can retrieve the private key associated with their user login from a secure location. For example, the user 104 can retrieve the private key from a secure location on device 102. The user 104 can then generate a new password for their user login at server 108. The user 104 can generate the new password subject to various conditions (e.g., a password policy) enforced by server 108. For example, the user 104 can generate the new password such that it's a minimum length, a mix of letters, number, and symbols, and/or was not previously used by the user 104.

After generating the new password, the user 104 can encrypt the new password using the private key associated with their user login. For example, the user 104 can instruct device 102 to encrypt the new password using the private key associated with their user login. The user 104 can then provide a password change request to password rotator 106. The password change request can include the cleartext version of the new password and the encrypted version of the new password. The user 104 can instruct device 102 to transmit the password change request to password rotator 106.

The user 104 can also provide the password change request to an automated system generated by password rotator 106. For example, the user 104 can instruct device 102 to transmit the password change request to the automated system generated by password rotator 106.

In response to receiving the password change request, password rotator 106 (or the automated system generated by password rotator 106) can execute a command at server 108 with the following parameters: the user 104's user login, the password of password rotator 106, the cleartext version of the new password for the user 104, and the encrypted version of the new password for the user 104. For example, password rotator 106 (or the automated system generated by password rotator 106) can execute an extended SQL command of "ALTER LOGIN <login name> WITH PASSWORD <caller password> MODIFY PASSWORD <cleartext version of the new password> VERIFY WITH <encrypted version of the new password>" to securely change the password for the user 104 to the new password. In this example, "login name" may represent the user login name at server 108 associated with the user 104. The "caller password" may represent the password for the user login associated with password rotator 106. The "cleartext version of the new password" may represent the cleartext version of the new password for the user 104. And the "encrypted version of the new password" may represent the encrypted version of the new password for the user 104.

Password rotator 106 can execute other extended SQL commands to securely change the password for the user 104 to the new password. For example, password rotator 106 (or the automated system generated by password rotator 106) can execute an extended SQL command of "ALTER LOGIN <login name> WITH PASSWORD <caller password> MODIFY PASSWORD <cleartext version of the new password> CHECK WITH <encrypted version of the new password>" to securely change the password for the user 104 to the new password. In this example, "login name" may represent the user login name at server 108 associated with the user 104. The "caller password" may represent the password for the user login associated with password rotator 106. The "cleartext version of the new password" may represent the cleartext version of the new password for the user 104. And the "encrypted version of the new password" may represent the encrypted version of the new password for the user 104. Password rotator 106 can execute other extended SQL commands to securely change the password for the user 104 to the new password as would be appreciated by a person of ordinary skill in the art.

In response to executing the command at server 108 with the above parameters, server 108 may validate the password change request. For example, server 108 may confirm that the request actually came from the user 104. Server 108 may also confirm that the proposed new password has not been changed since proposed by the user 104. This validation check can ensure that an unauthorized or illegitimate user is unable to pretend to be the user 104 which can cause the user 104 to lose access to server 108 and the illegitimate user to gain access to server 108 on behalf of the user 104.

To determine that the password change request comes from the user 104 and that the cleartext version of the new password has not been modified, server 108 can retrieve the "encrypted version of the new password" parameter from the received command. Server 108 can then use the "login name" parameter to retrieve the public key associated with the user 104. For example, server 108 can use the "login name" parameter to retrieve the public key associated with the user 104 from server 108 itself.

After retrieving the encrypted version of the new password and the public key associated with the user 104, server 108 can attempt to decrypt the encrypted version of the new password with the public key. If server 108 fails to decrypt the encrypted version of the new password with the public key, server 108 can reject the password change request. In other words, server 108 can ignore changing the password associated with the user 104. Server 108 may also notify password rotator 106 (or the user 104 at device 102) that it rejected the password change request. For example, server 108 may transmit a notification to password rotator 106 (or the user 104 at device 102) that it rejected the password change request.

Server 108 may fail to decrypt the encrypted version of the new password with the public key for various reasons. For example, server 108 may fail to decrypt the encrypted version of the new password with the public key because the public key has expired or because of a difference between the cipher version used by the user 104 and the cipher version used by server 108. Server 108 may fail to decrypt the encrypted version of the new password with the public key for various other reasons as would be appreciated by a person of ordinary skill in the art.

If server 108 successfully decrypts the encrypted version of the new password with the public key, server 108 can determine whether the decrypted version of the new password matches the cleartext version of the new password. If server 108 determine that the decrypted version of the new password does not match the cleartext version of the new password, server 108 can reject the password change request. In other words, server 108 can ignore changing the password associated with the user 104. Server 108 may also notify password rotator 106 (or the user 104 at device 102) that it rejected the password change request. For example, server 108 may transmit a notification to password rotator 106 (or the user 104 at device 102) that it rejected the password change request.

If server 108 successfully decrypted the encrypted version of the new password with the public key, and determines that the decrypted version of the new password matches the cleartext version of the new password, server 108 can ensure that the password change request comes from the user 104 and that the cleartext version of the new password has not been modified. Server 108 can then proceed with changing the password for the user 104 to the new password.

To change the password for the user 104, server 108 can update the user login associated with the user 104 such that the current password associated with the user login is replaced with the new password. Server 108 can also change the password for the user 104 by generating a hash of the new password. For example, server 108 can generate a hash of the new password using a hash function such as, but not limited to, message-digest 5 (MD5), Secure Hash Algorithm 1 (SHA-1), and Secure Hash Algorithm 256 (SHA-256). Server 108 can then update the user login associated with the user 104 such that the current password hash associated with the user login is replaced with the generated hash of the new password.

After changing the password for the user 104, server 108 may notify password rotator 106 (or the user 104 at device 102) that it successfully performed the password change request. For example, server 108 may transmit a notification to password rotator 106 (or the user 104 at device 102) that it successfully performed the password change. At this point, the user 104 can use the new password to login to server 108 under their user login.

In some circumstances, the user 104 may need to renew or rotate their asymmetric encryption key pair. This may occur because the key pair has been compromised. In this case, the user 104 can generate a new asymmetric encryption key pair. As would be appreciated by a person of ordinary skill in the art, the new asymmetric encryption key pair may be shared by a set of users (including the user 104).

After generating the new asymmetric encryption key pair, the user 104 can save the new private key in a secure location outside of server 108. For example, the user 104 can securely save the private key on device 102.

The user 104 can also provide the corresponding new public key to server 108. For example, the user 104 can provide the corresponding new public key to server 108 such that server 108 saves the new public key with the user login for the user 104.

The user 104 may provide the corresponding new public key to server 108 by executing a command at server 108 with the new public key as a parameter. In the case of server 108 being a DBMS, the user 104 may execute an extended SQL command at server 108 with the new public key as a parameter. Server 108 may define the extended SQL command. The execution of the extended SQL command may cause server 108 to save the provided public key with the user login for the user 104.

For example, the user 104 may execute an extended SQL command of "SET PASSWORD VERIFICATION USING <new public key value|new public key file>" to save the provided new public key with the user login for the user 104. In this example, "new public key value" may represent the new public key (e.g., expressed in hexadecimal form). The new public key may also be provided as "new public key file," where "new public key file" represents a filename path to the new public key.

In response to executing the command at server 108 with the new public key as a parameter, server 108 may replace any existing public key associated with the user login for the user 104 with the new public key. As a result, password rotator 106 may be able to securely change the password for the user login of the user 104 at server 108 based on the new asymmetric encryption key pair.

In some other aspects, the user 104 can securely change the password for their user login at server 108 by providing their private key. To begin, the user 104 can retrieve the private key associated with their user login from a secure location. For example, the user 104 can retrieve the private key from a secure location on device 102. The user 104 can then generate a new password for their user login at server 108.

After generating the new password, the user 104 can provide a password change request to password rotator 106. The password change request can include the cleartext version of the new password and the private key. The user 104 can instruct device 102 to transmit the password change request to password rotator 106.

The user 104 can also provide the password change request to an automated system generated by password rotator 106. For example, the user 104 can instruct device 102 to transmit the password change request to the automated system generated by password rotator 106.

In response to receiving the password change request, password rotator 106 (or the automated system generated by password rotator 106) can execute a command at server 108 with the following parameters: the user 104's user login, the password of password rotator 106, the cleartext version of the new password for the user 104, and the private key for the user 104. For example, password rotator 106 (or the automated system generated by password rotator 106) can execute an extended SQL command of "ALTER LOGIN <login name> WITH PASSWORD <caller password> MODIFY PASSWORD <cleartext version of the new password> VERIFY WITH <private key>" to securely change the password for the user 104 to the new password. In this example, "login name" may represent the user login name at server 108 associated with the user 104. The "caller password" may represent the password for the user login associated with password rotator 106. The "cleartext version of the new password" may represent the cleartext version of the new password for the user 104. And the "private key" may represent the private key for the user 104.

In response to executing the command at server 108 with the above parameters, server 108 may validate the password change request. For example, server 108 may confirm that the request actually came from the user 104. Server 108 may also confirm that the proposed new password has not been changed since proposed by the user 104. This validation check can ensure that an unauthorized or illegitimate user is unable to pretend to be the user 104 which can cause the user 104 to lose access to server 108 and the illegitimate user to gain access to server 108 on behalf of the user 104.

To determine that the password change request comes from the user 104, server 108 can retrieve the "private key" parameter from the received command. Server 108 can then use the "login name" parameter to retrieve the public key associated with the user 104. For example, server 108 can use the "login name" parameter to retrieve the public key associated with the user 104 from server 108 itself.

After retrieving the private key and the public key, server 108 can determine whether the private key and the public key belong to the same asymmetric key pair. If server 108 determines that the private key and the public key belong to the same asymmetric key pair, server 108 can ensure that the password change request comes from the user 104. Server 108 can then proceed with changing the password for the user 104 to the new password.

After changing the password for the user 104, server 108 may notify password rotator 106 (or the user 104 at device 102) that it successfully performed the password change request. For example, server 108 may transmit a notification to password rotator 106 (or the user 104 at device 102) that it successfully performed the password change. At this point, the user 104 can use the new password to login to server 108 under their user login.

Figure 2:
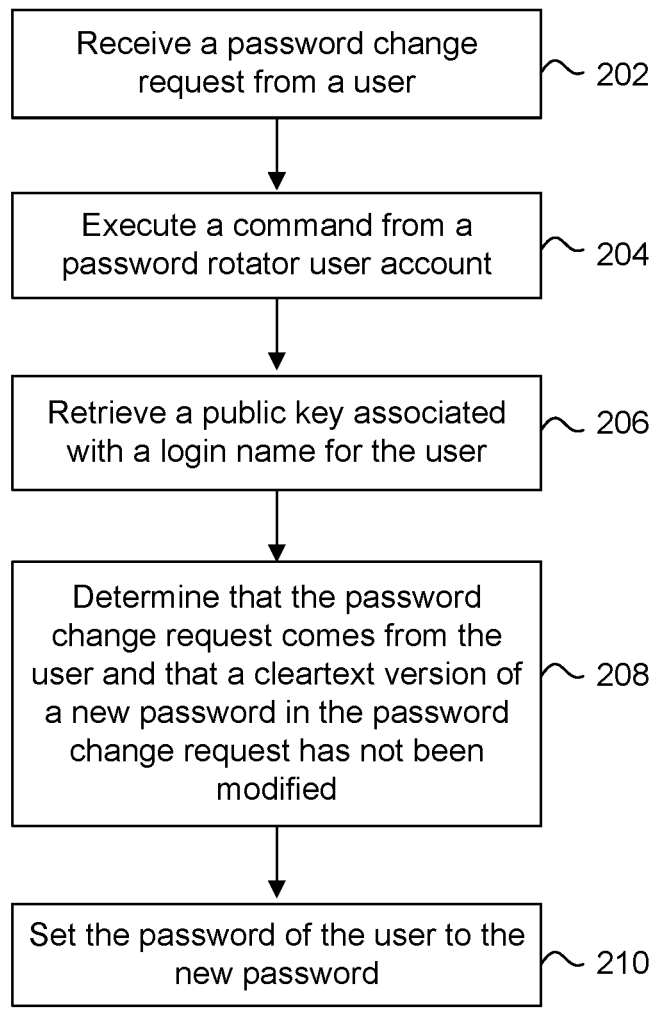
FIG. 2 is a flowchart illustrating a process for securely performing a password change, according to some embodiments.

FIG. 2 is a flowchart for a method 200 for securely performing a password change, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 200 shall be described with reference to FIG. 1. However, method 200 is not limited to that example embodiment.

In 202, server 108 receives a password change request from a user 104. The change request may include an encrypted version of a new password for the user 104. The encrypted version of the new password may be encrypted with a private key associated with the user 104. The password change request may also include a cleartext version of the new password for the user 104. The password change request may also include a login name for the user 104.

In 204, server 108 executes a command from a password rotator user account. Server 108 may execute the command with the cleartext version of the new password, the encrypted version of the new password, and the login name for the user 104. The command may be a SQL command (e.g., an extended SQL command).

In 206, server 108 retrieves a public key associated with the login name for the user 104.

In 208, server 108 determines that the password change request comes from the user 104 and that the cleartext version of the new password has not been modified. Server 108 may determine that the password change request comes from the user 104 and that the cleartext version of the new password has not been modified based on the public key associated with the login name for the user 104.

Server 108 may decrypt the encrypted version of the new password with the public key associated with the login name of the user 104. Server 108 may then determine that the decryption was successful.

Server 108 may also decrypt the encrypted version of the new password with the public key associated with the login name of the user 104, thereby generating a decrypted version of the new password. Server 108 may then determine that the decrypted version of the new password matches the cleartext version of the new password.

In 210, server 108 sets the password of the user 104 to the new password. Server 108 may set the password of the user 104 to the new password in response to determining that the password change request comes from the user 104 and that the cleartext version of the new password has not been modified.

Server 108 may set the password of the user 104 to the new password by generating a hash of the new password. Server 108 may then update the user login associated with the user 104 such that the current password hash associated with the user login is replaced with the generated hash of the new password.

Server 108 may also set the password of the user 104 to the new password by replacing the old version of the password with the new password. Server 108 can store the new version of the password in encrypted form. Server 108 can encrypt the new version of the password using various encryption techniques as appreciated by a person of ordinary skill in the art. Server 108 can also store the new version of the password in cleartext.

Figure 3:
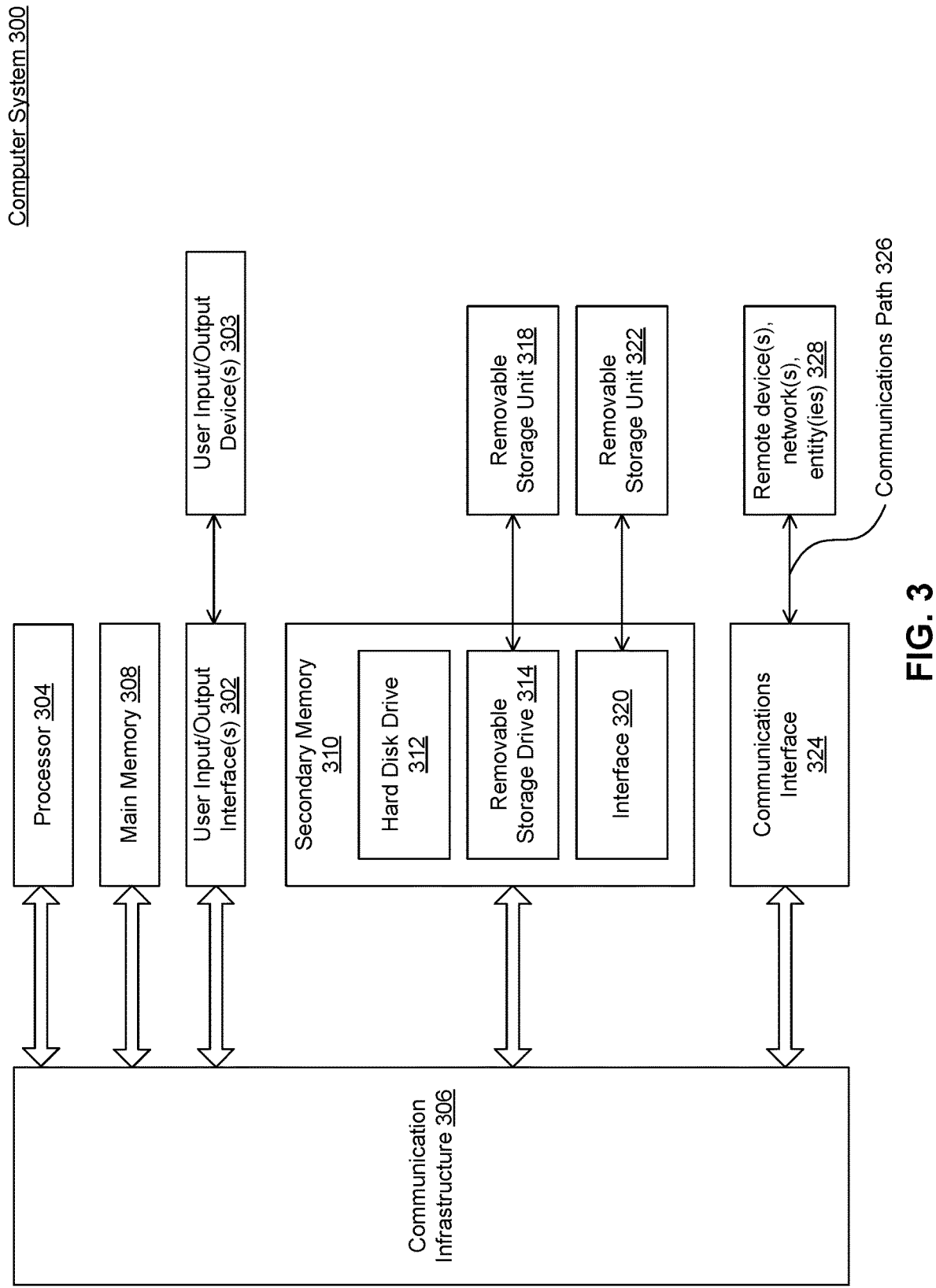
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for securely performing a password change, comprising:
   receiving a password change request from a user, wherein the password change request comprises an encrypted version of a new password for the user, a cleartext version of the new password, and a login name for the user, and wherein the encrypted version of the new password is encrypted with a private key associated with the user;
   executing a command from a password rotator user account with the cleartext version of the new password, the encrypted version of the new password, and the login name;
   retrieving a public key associated with the login name;
   determining, based on the public key, that the password change request comes from the user and that the cleartext version of the new password has not been modified; and
   setting the password of a user login associated with the user to the new password in response to the determining.

2. The method of claim 1, wherein the determining further comprises:
   decrypting the encrypted version of the new password with the public key; and
   determining that the decrypting was successful.

3. The method of claim 1, wherein the determining further comprises:
   decrypting the encrypted version of the new password with the public key, thereby generating a decrypted version of the new password; and
   determining that the decrypted version of the new password matches the cleartext version of the new password.

4. The method of claim 1, further comprising:
   receiving a request to rotate the public key and the private key, wherein the request comprises a new public key for the user; and
   updating the user login such that a current public key associated with the user login is replaced with the new public key.

5. The method of claim 1, wherein the public key and the private key are associated with a set of users comprising the user.

6. The method of claim 1, wherein the command is an extended Structured Query Language (SQL) command.

7. The method of claim 1, wherein the setting further comprises:
   generating a hash of the new password in response to the determining; and
   updating the user login such that a current password hash associated with the user login is replaced with the generated hash of the new password.

8. A system for securely performing a password change, comprising:
   a memory; and
   at least one processor coupled to the memory and configured to:
      receive a password change request from a user, wherein the password change request comprises an encrypted version of a new password for the user, a cleartext version of the new password, and a login name for the user, and wherein the encrypted version of the new password is encrypted with a private key associated with the user;
      execute a command from a password rotator user account with the cleartext version of the new password, the encrypted version of the new password, and the login name;
      retrieve a public key associated with the login name;
      determine, based on the public key, that the password change request comes from the user and that the cleartext version of the new password has not been modified; and
      set the password of a user login associated with the user to the new password in response to the determining.

9. The system of claim 8, wherein to determine that the password change request comes from the user and that the cleartext version of the new password has not been modified, the at least one processor is configured to:
   decrypt the encrypted version of the new password with the public key; and
   determine that the decrypting was successful.

10. The system of claim 8, wherein to determine that the password change request comes from the user and that the cleartext version of the new password has not been modified, the at least one processor is configured to:
    decrypt the encrypted version of the new password with the public key, thereby generating a decrypted version of the new password; and
    determine that the decrypted version of the new password matches the cleartext version of the new password.

11. The system of claim 8, wherein the at least one processor is further configured to:
    receive a request to rotate the public key and the private key, wherein the request comprises a new public key for the user; and update the user login such that a current public key associated with the user login is replaced with the new public key.

12. The system of claim 8, wherein the public key and the private key are associated with a set of users comprising the user.

13. The system of claim 8, wherein the command is an extended Structured Query Language (SQL) command.

14. The system of claim 8, wherein to set the password of the user login associated with the user to the new password, the at least one processor is configured to:
   generate a hash of the new password in response to the determining; and
   update the user login such that a current password hash associated with the user login is replaced with the generated hash of the new password.

15. A non-transitory computer-readable device having instructions stored thereon that, when executed by at least one computing device, cause the at least one computing device to perform operations comprising:
   receiving a password change request from a user, wherein the password change request comprises an encrypted version of a new password for the user, a cleartext version of the new password, and a login name for the user, and wherein the encrypted version of the new password is encrypted with a private key associated with the user;
   executing a command from a password rotator user account with the cleartext version of the new password, the encrypted version of the new password, and the login name;
   retrieving a public key associated with the login name;
   determining, based on the public key, that the password change request comes from the user and that the cleartext version of the new password has not been modified; and
   setting the password of a user login associated with the user to the new password in response to the determining.

16. The non-transitory computer-readable device of claim 15, wherein the determining further comprises:
   decrypting the encrypted version of the new password with the public key; and
   determining that the decrypting was successful.

17. The non-transitory computer-readable device of claim 15, wherein the determining further comprises:
   decrypting the encrypted version of the new password with the public key, thereby generating a decrypted version of the new password; and
   determining that the decrypted version of the new password matches the cleartext version of the new password.

18. The non-transitory computer-readable device of claim 15, wherein the operations further comprise:
   receiving a request to rotate the public key and the private key, wherein the request comprises a new public key for the user; and
   updating the user login such that a current public key associated with the user login is replaced with the new public key.

19. The non-transitory computer-readable device of claim 15, wherein the command is an extended Structured Query Language (SQL) command.

20. The non-transitory computer-readable device of claim 15, wherein the determining further comprises:
   generating a hash of the new password in response to the determining; and
   updating the user login such that a current password hash associated with the user login is replaced with the generated hash of the new password.

* * * * *